(12) United States Patent
Shindo et al.

(10) Patent No.: US 7,559,855 B2
(45) Date of Patent: *Jul. 14, 2009

(54) GOLF BALL

(75) Inventors: Jun Shindo, Chichibu (JP); Takahiro Hayashi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/878,941

(22) Filed: Jul. 27, 2007

(65) Prior Publication Data

US 2008/0076600 A1 Mar. 27, 2008

Related U.S. Application Data

(63) Continuation-in-part of application No. 11/324,297, filed on Jan. 4, 2006, now Pat. No. 7,294,067.

(30) Foreign Application Priority Data

Jul. 2, 2007 (JP) ............................. 2007-173997

(51) Int. Cl.
*A63B 37/06* (2006.01)

(52) U.S. Cl. ..................................... 473/374

(58) Field of Classification Search ................ 473/351, 473/367, 368, 373, 374

See application file for complete search history.

(56) References Cited

U.S. PATENT DOCUMENTS

| | | | |
|---|---|---|---|
| 6,184,276 B1 | 2/2001 | Ignatz-Hoover | |
| 6,194,505 B1 * | 2/2001 | Sone et al. ................. | 524/432 |
| 6,277,924 B1 | 8/2001 | Hamada et al. | |
| 6,372,847 B1 | 4/2002 | Wouters | |
| 6,596,801 B2 * | 7/2003 | Higuchi et al. .............. | 524/432 |
| 6,602,941 B2 | 8/2003 | Higuchi et al. | |
| 6,634,961 B2 | 10/2003 | Higuchi et al. | |
| 6,695,716 B2 | 2/2004 | Higuchi et al. | |
| 6,712,715 B2 | 3/2004 | Higuchi et al. | |
| 6,786,836 B2 | 9/2004 | Higuchi et al. | |
| 6,795,172 B2 | 9/2004 | Putman et al. | |
| 6,818,705 B2 | 11/2004 | Wu et al. | |
| 6,841,642 B2 | 1/2005 | Kaszas | |
| 6,921,345 B2 | 7/2005 | Higuchi et al. | |
| 6,923,735 B1 | 8/2005 | Hayashi | |
| 7,250,010 B1 * | 7/2007 | Shindo et al. ............... | 473/351 |
| 7,294,067 B2 * | 11/2007 | Shindo et al. ............... | 473/351 |
| 2004/0147694 A1 | 7/2004 | Sone et al. | |
| 2005/0148723 A1 | 7/2005 | Kondou | |

FOREIGN PATENT DOCUMENTS

| | | |
|---|---|---|
| JP | 7-268132 A | 10/1995 |
| JP | 11-35633 A | 2/1999 |
| JP | 2002-355336 A | 12/2002 |
| JP | 2002-355337 A | 12/2002 |
| JP | 2002-355338 A | 12/2002 |
| JP | 2002-355339 A | 12/2002 |
| JP | 2002-355340 A | 12/2002 |
| JP | 2002-356581 A | 12/2002 |
| JP | 2004-292667 A | 10/2004 |
| WO | WO 03/082925 | 10/2003 |

OTHER PUBLICATIONS

"Report of Research & Development", Fine Chemical, vol. 23, No. 9, p. 5-15 (1994).
"Hydrolysis of Tri-tert-butylaluminum" by Mason et al., J. American Chemical Society, vol. 115, pp. 4971-4984 (1993).
"Three-Coordinate Aluminum Is Not a Prerequisite for Catalytic Activity in the Zirconocene-Alumoxane Polymerization of Ethylene", by Harlen et al, J. American Chemical Society, vol. 117, pp. 6465-6474, (1995).

* cited by examiner

*Primary Examiner*—Raeann Trimiew
(74) *Attorney, Agent, or Firm*—Sughrue Mion, PLLC

(57) ABSTRACT

The present invention provides a golf ball having a core, an inner cover layer and an outer cover layer. The core is made of a material obtained by molding under heat a rubber composition containing (a) a base rubber containing polybutadiene having a stress relaxation time ($T_{80}$), (b) an unsaturated carboxylic acid and/or a metal salt thereof, and (c) an organic peroxide. The inner cover layer has a Shore D hardness of from 50 to 80, and the outer cover layer has a Shore D hardness of from 35 to 60 which is lower than the Shore D hardness of the inner cover layer. The golf ball has an excellent rebound overall, a good, soft feel on impact, and an outstanding spin performance that enables the ball to travel farther when played.

6 Claims, No Drawings

1

GOLF BALL

CROSS-REFERENCE TO RELATED APPLICATION

This application is a continuation-in-part of copending application Ser. No. 11/324,297 filed on Jan. 4, 2006, the entire contents of which are hereby incorporated by reference.

This application claims priority under 35 U.S.C. S119(a) on Patent Application No. 2007-173997 filed in Japan on Jul. 2, 2007, the entire contents of which are hereby incorporated by reference.

BACKGROUND OF THE INVENTION

The present invention relates to a golf ball having an excellent rebound.

Efforts to confer golf balls with an excellent rebound have until now focused on and attempted to optimize one or more indicator of the polybutadiene used as the base rubber, such as the Mooney viscosity, polymerization catalyst, solvent viscosity and molecular weight distribution. See, for example, Patent Document 1: JP-A 2004-292667; Patent Document 2: U.S. Pat. No. 6,818,705; Patent Document 3: JP-A 2002-355336; Patent Document 4: JP-A 2002-355337; Patent Document 5: JP-A 2002-355338; Patent Document 6: JP-A 2002-355339; Patent Document 7: JP-A 2002-355340; and Patent Document 8: JP-A 2002-356581.

For example, Patent Document 1 (JP-A 2004-292667) describes, as a base rubber for golf balls, a polybutadiene having a Mooney viscosity of 30 to 42 and a molecular weight distribution (Mw/Mn) of 2.5 to 3.8. Patent Document 2 (U.S. Pat. No. 6,818,705) describes, for the same purpose, a polybutadiene having a molecular weight of at least 200,000 and a resilience index of at least 40.

However, because many golfers desire golf balls capable of traveling a longer distance, there exists a need for the development of golf balls having an even better rebound.

Patent Document 1: JP-A 2004-292667
Patent Document 2: U.S. Pat. No. 6,818,705
Patent Document 3: JP-A 2002-355336
Patent Document 4: JP-A 2002-355337
Patent Document 5: JP-A 2002-355338
Patent Document 6: JP-A 2002-355339
Patent Document 7: JP-A 2002-355340
Patent Document 8: JP-A 2002-356581

SUMMARY OF THE INVENTION

It is therefore an object of the present invention to provide a golf ball having an excellent rebound.

As a result of extensive investigations, the inventor has discovered that, in a golf ball composed of a core, an inner cover layer and an outer cover layer, a good ball rebound is maintained by forming the core of a material obtained by molding under heat a rubber composition which includes a base rubber containing a polybutadiene having a specific $T_{80}$ value, an unsaturated carboxylic acid and/or a metal salt thereof, and an organic peroxide; and by setting the inner cover layer to a Shore D hardness in a range of 50 to 80, setting the outer cover layer to a Shore D hardness in a range of 35 to 60, and forming the outer cover layer so as to be softer than the inner cover layer. Solid multi-piece golf balls which exhibit a good synergy from optimization of the core material and an appropriate distribution of hardness between the inner cover layer and the outer cover layer have a good, soft feel when hit with a golf club and an excellent spin performance that enables the ball to travel farther when played.

Accordingly, the invention provides the following golf ball.

[1] A golf ball comprising a core, an inner cover layer and an outer cover layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; the inner cover layer has a Shore D hardness of from 50 to 80; and the outer cover layer has a Shore D hardness of from 35 to 60 which is lower than the Shore D hardness of the inner cover layer.

[2] The golf ball of [1], wherein the rubber composition further comprises (d) an organosulfur compound.

[3] The golf ball of [1], wherein the polybutadiene having a stress relaxation time ($T_{80}$) of 3.5 or less accounts for at least 40 wt % of the base rubber.

[4] The golf ball of [1], wherein the polybutadiene having a stress relaxation time ($T_{80}$) of 3.5 or less is a polybutadiene prepared using a rare-earth catalyst.

[5] The golf ball of [1], wherein the polybutadiene having a stress relaxation time ($T_{80}$) of 3.5 or less is a polybutadiene prepared by polymerization using a rare-earth catalyst, followed by terminal modification.

DETAILED DESCRIPTION OF THE INVENTION

The invention is described more fully below.

The golf ball of the invention has a core made of a rubber composition that includes a polybutadiene as the base rubber. More specifically, the core is made of a material obtained by molding under heat a rubber composition which includes the following components (a) to (c):

(a) a base rubber containing polybutadiene having a stress relaxation time ($T_{80}$), as defined below, of 3.5 or less, (b) an unsaturated carboxylic acid and/or a metal salt thereof, and (c) an organic peroxide.

The stress relaxation time ($T_{80}$) is the time in seconds, from the moment when rotor rotation is stopped immediately after measurement of the $ML_{1+4}$ (100° C.) value (the Mooney viscosity measured at 100° C. in accordance with ASTM D-1646-96), that is required for the $ML_{1+4}$ value to decrease 80%.

The term "Mooney viscosity" used herein refers to an industrial indicator of viscosity as measured with a Mooney viscometer, which is a type of rotary plastometer. The unit symbol used is $ML_{1+4}$ (100° C.), where "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

In the practice of the invention, the polybutadiene in above component (a) includes a polybutadiene having a stress relaxation time ($T_{80}$) of 3.5 or less (which polybutadiene is sometimes abbreviated below as "BR1"). The $T_{80}$ value is preferably 3.0 or less, more preferably 2.8 or less, and even more preferably 2.5 or less. The $T_{80}$ value has a lower limit of preferably 1 or more, and more preferably 1.5 or more. At a $T_{80}$ value of more than 3.5, the objects of the invention cannot be attained. On the other hand, if the $T_{80}$ value is too small, problems may arise with workability.

The foregoing polybutadiene BR1 has a Mooney viscosity ($ML_{1+4}$ (100° C.)) which, while not subject to any particular limitation, is preferably at least 20 but not more than 80.

It is recommended that the above polybutadiene BR1 have a cis-1,4 bond content of preferably 60%, more preferably at least 80%, even more preferably at least 90%, and most preferably at least 95%, and a 1,2-vinyl bond content of preferably at most 2%, more preferably at most 1.7%, even more preferably at most 1.5%, and most preferably at most 1.3%. At a cis-1,4 bond content or a 1,2-vinyl bond content outside of these ranges, the rebound may decrease.

From the standpoint of rebound, it is preferable for the above polybutadiene BR1 used in the invention to be a polybutadiene synthesized using a rare-earth catalyst.

A known rare-earth catalyst may be used for this purpose. Exemplary rare-earth catalysts include those made up of a combination of a lanthanide series rare-earth compound, an organoaluminum compound, an alumoxane, a halogen-bearing compound, and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in *Fine Chemical* 23, No. 9, 5 (1994), *J. Am. Chem. Soc.* 115, 4971 (1993), and *J. Am. Chem. Soc.* 117, 6465 (1995) are also acceptable.

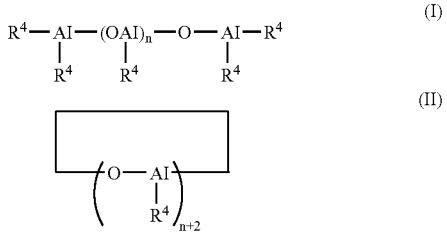

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of preferably from −30 to +150° C., and more preferably from 10 to 100° C.

To manufacture golf balls of stable quality, it is desirable for the above-described polybutadiene BR1 used in the invention to be a terminal-modified polybutadiene obtained by polymerization using the above-described rare-earth catalyst, followed by the reaction of a terminal modifier with active end groups on the polymer.

A known terminal modifier may be used for this purpose. Illustrative examples include compounds of types (1) to (6) below.

(1) Halogenated organometallic compounds, halogenated metallic compounds and organometallic compounds of the general formulas $R^5{}_nM'X_{4-n}$, $M'X_4$, $M'X_3$, $R^5{}_nM'(-R^6-COOR^7)_{4-n}$ or $R^5{}_nM'(-R^6-COR^7)_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(2) heterocumulene compounds having on the molecule a Y=C=Z linkage (wherein Y is a carbon, oxygen, nitrogen or sulfur atom; and Z is an oxygen, nitrogen or sulfur atom);

(3) three-membered heterocyclic compounds containing on the molecule the following bonds

(wherein Y is an oxygen, nitrogen or sulfur atom);

(4) halogenated isocyano compounds;

(5) carboxylic acids, acid halides, ester compounds, carbonate compounds and acid anhydrides of the formula $R^8-(COOH)_m$, $R^9(COX)_m$, $R^{10}-(COO-R^{11})$, $R^{12}-OCOO-R^{13}$, $R^{14}-(COOCO-R^{15})_m$ or

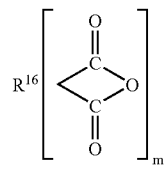

(wherein $R^8$ to $R^{16}$ are each independently a hydrocarbon group of 1 to 50 carbons, X is a halogen atom, and m is an integer from 1 to 5); and (6) carboxylic acid metal salts of the formula $R^{17}{}_1M''(OCOR^{18})_{4-1}$, $R^{19}{}_1M''(OCO-R^{20}-COOR^{21})_{4-1}$ or

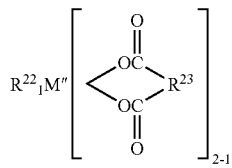

(wherein $R^{17}$ to $R^{23}$ are each independently a hydrocarbon group of 1 to 20 carbons, M'' is a tin, silicon or germanium atom, and the letter 1 is an integer from 0 to 3).

Specific examples of the above terminal modifiers (1) to (6) and methods for their reaction are described in, for example, JP-A 11-35633 and JP-A 7-268132.

In the practice of the invention, the above-described polybutadiene BR1 is included within the base rubber and accounts for preferably at least 40 wt %, more preferably at least 50 wt %, even more preferably at least 60 wt %, and even up to 100 wt %, of the base rubber. If this proportion is too low, the rebound may decrease.

No particular limitation is imposed on rubber compounds other than BR1 which may be included in the base rubber. For example, polybutadiene rubbers having a stress relaxation time $T_{80}$ of more than 3.5 may be included, as can also other rubber compounds such as styrene-butadiene rubbers (SBR), natural rubbers, polyisoprene rubbers and ethylene-propylene-diene rubbers (EPDM). These may be used individually or as combinations of two or more thereof.

The Mooney viscosity of such additional rubbers included in the base rubber, while not subject to any particular limitation, is preferably at least 20 but preferably not more than 80.

Rubbers synthesized with a group VIII catalyst may be used as such additional rubbers included in the base rubber. Exemplary group VIII catalysts include the following nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Polymerization using the above group VIII catalysts, and particularly a nickel or cobalt catalyst, can be carried out by a process in which, typically, the catalyst is continuously charged into a reactor together with a solvent and butadiene monomer, and the reaction conditions are suitably selected, such as a reaction temperature in a range of 5 to 60° C. and a reaction pressure in a range of atmospheric pressure to 70 plus atmospheres, so as to yield a product having the above-indicated Mooney viscosity.

Above component (b) may be an unsaturated carboxylic acid, specific examples of which include acrylic acid, methacrylic acid, maleic acid and fumaric acid. Acrylic acid and methacrylic acid are especially preferred. Alternatively, it may be the metal salt of an unsaturated carboxylic acid, examples of which include the zinc and magnesium salts of unsaturated fatty acids such as zinc dimethacrylate and zinc diacrylate. The use of zinc diacrylate is especially preferred.

It is recommended that the content of above component (b) per 100 parts by weight of the base rubber be preferably at least 10 parts by weight, and more preferably at least 15 parts by weight, but preferably not more than 60 parts by weight, more preferably not more than 50 parts by weight, even more preferably not more than 45 parts by weight, and most preferably not more than 40 parts by weight. Too much component (b) will make the material molded under heat from the rubber composition too hard, giving the golf ball an unpleasant feel on impact. On the other hand, too little will result in a lower rebound.

Above component (c) may be a commercially available product, suitable examples of which include Percumyl D (produced by NOF Corporation), Perhexa 3C(NOF Corporation) and Luperco 231XL (Atochem Co.). If necessary, a combination of two or more different organic peroxides may be used.

It is recommended that the amount of component (c) per 100 parts by weight of the base rubber be preferably at least 0.1 part by weight, and more preferably at least 0.3 part by weight, but preferably not more than 5 parts by weight, more preferably not more than 4 parts by weight, even more preferably not more than 3 parts by weight, and most preferably not more than 2 parts by weight. Too much or too little component (c) may make it impossible to obtain a suitable hardness distribution, resulting in a poor feel on impact, durability and rebound.

To further improve rebound, it is desirable for the rubber composition in the invention to include also the following component (d):

(d) an organosulfur compound.

Examples of such organosulfur compounds include thiophenols, thionaphthols, halogenated thiophenols, and metal salts thereof. Specific examples include the zinc salts of pentachlorothiophenol, pentafluorothiophenol, pentabromothiophenol and p-chlorothiophenol; and diphenylpolysulfides, dibenzylpolysulfides, dibenzoylpolysulfides, dibenzothiazoylpolysulfides and dithiobenzoylpolysulfides having 2 to 4 sulfurs. These may be used singly or as combinations of two or more thereof. Diphenyldisulfide and/or the zinc salt of pentachlorothiophenol are especially preferred.

It is recommended that the amount of component (d) included per 100 parts by weight of the base rubber be preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. Too much organosulfur compound may make the material molded under heat from the rubber composition too soft, whereas too little may make an improved rebound difficult to achieve.

The rubber composition in the invention may additionally include such additives as inorganic fillers and antioxidants. Illustrative examples of suitable inorganic fillers include zinc oxide, barium sulfate and calcium carbonate. The amount included per 100 parts by weight of the base rubber is preferably at least 5 parts by weight, more preferably at least 7 parts by weight, even more preferably at least 10 parts by weight, and most preferably at least 13 parts by weight, but preferably not more than 80 parts by weight, more preferably not more than 50 parts by weight, even more preferably not more than 45 parts by weight, and most preferably not more than 40 parts by weight. Too much or too little inorganic filler may make it impossible to obtain a proper golf ball weight and a suitable rebound.

To increase the rebound, it is desirable for the inorganic filler to include zinc oxide in an amount of at least 50 wt %, preferably at least 75 wt %, and most preferably 100 wt % (where the zinc oxide accounts for 100% of the inorganic filler).

The zinc oxide has an average particle size (by air permeametry) of preferably at least 0.01 µm, more preferably at least 0.05 µm, and most preferably at least 0.1 µm, but preferably not more than 2 µm, and more preferably not more than 1 µm.

Examples of suitable commercial antioxidants include 2,2'-methylenebis(4-methyl-6-t-butylphenol) (Nocrac NS-6, available from Ouchi Shinko Chemical Industry Co., Ltd.) and 2,2'-methylenebis(4-ethyl-6-t-butylphenol) (Nocrac NS-5, Ouchi Shinko Chemical Industry Co., Ltd.). To achieve a good rebound and durability, it is recommended that the amount of antioxidant included per 100 parts by weight of the base rubber be preferably more than 0 part by weight, more preferably at least 0.05 part by weight, even more preferably at least 0.1 part by weight, and most preferably at least 0.2 part by weight, but preferably not more than 3 parts by weight, more preferably not more than 2 parts by weight, even more preferably not more than 1 part by weight, and most preferably not more than 0.5 part by weight.

The core in the present invention can be obtained by vulcanizing and curing the rubber composition using a method of the same sort as that used on prior-art rubber compositions for golf balls. Vulcanization may be carried, for example, at a temperature of from 100 to 200° C. for a period of 10 to 40 minutes.

It is recommended that the core (hot-molded material) in the invention have a hardness difference, obtained by subtracting the JIS-C hardness at the center of the hot-molded material from the JIS-C hardness at the surface of the material, of preferably at least 15, more preferably at least 16, even more preferably at least 17, and most preferably at least 18, but preferably not more than 50, and more preferably not more than 40. Setting the hardness within this range is desirable for achieving a golf ball having a soft feel and a good rebound and durability.

It is also recommended that the core (hot-molded material) in the invention have a deflection, when compressed under a final load of 1275 N (130 kgf) from an initial load of 98 N (10 kgf), of preferably at least 2.0 mm, more preferably at least 2.5 mm, and even more preferably at least 2.8 mm, but preferably not more than 6.0 mm, more preferably not more than 5.5 mm, even more preferably not more than 5.0 mm, and most preferably not more than 4.5 mm. Too small a deflection may worsen the feel of the ball on impact and, particularly on long shots such as with a driver in which the ball incurs a large deformation, may subject the ball to an excessive rise in spin, shortening the distance traveled by the ball. On the other hand, a hot-molded material that is too soft may deaden the feel of the golf ball when played and compromise the rebound of the ball, resulting in a shorter distance, and may give the ball a poor durability to cracking with repeated impact.

It is recommended that the core have a diameter of preferably at least 30.0 mm, more preferably at least 32.0 mm, even more preferably at least 35.0 mm, and most preferably at least 37.0 mm, but preferably not more than 41.0 mm, more preferably not more than 40.5 mm, even more preferably not more than 40.0 mm, and most preferably not more than 39.5 mm.

It is recommended that such a solid core in a solid three-piece golf ball have a diameter of preferably at least 30.0 mm, more preferably at least 32.0 mm, even more preferably at least 34.0 mm, and most preferably at least 35.0 mm, but preferably not more than 40.0 mm, more preferably not more than 39.5 mm, and even more preferably not more than 39.0 mm.

It is also recommended that the core have a specific gravity of preferably at least 0.9, more preferably at least 1.0, and even more preferably at least 1.1, but preferably not more than 1.4, more preferably not more than 1.3, and even more preferably not more than 1.2.

The golf ball of the invention is a solid multi-piece golf ball having a cover composed of at least two layers which are referred to herein as the "inner cover layer" and the "outer cover layer." Such cover layers can be produced from known cover materials. The cover materials used to make both cover layers in the inventive golf ball may be composed primarily of a thermoplastic or thermoset polyurethane elastomer, a polyester elastomer, an ionomer resin, an ionomer resin having a relatively high degree of neutralization, a polyolefin elastomer or a mixture thereof. Any one or mixture of two or more thereof may be used, although the use of a thermoplastic polyurethane elastomer, an ionomer resin or an ionomer resin having a relatively high degree of neutralization is especially preferred.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080, Pandex T8290, Pandex T8295 and Pandex T1188 (all manufactured by DIC Bayer Polymer, Ltd.). Illustrative examples of suitable commercial ionomer resins include Surlyn 6320, Surlyn 8945, Surlyn 9945 and Surlyn 8120 (both products of E.I. DuPont de Nemours and Co., Inc.), and Himilan 1706, Himilan 1605, Himilan 1855, Himilan 1557, Himilan 1601 and Himilan AM7316 (all products of DuPont-Mitsui Polychemicals Co., Ltd.).

Together with the primary material described above, the cover material may include also, as an optional material, a polymer other than the foregoing thermoplastic elastomers. Specific examples of polymers that may be included as optional ingredients include polyamide elastomers, styrene block elastomers, hydrogenated polybutadienes and ethylene-vinyl acetate (EVA) copolymers.

The golf ball of the invention can be manufactured by any suitable known method without particular limitation. In one preferred method, the solid core is placed within a given injection mold, following which a predetermined method is used to successively inject over the core the above-described inner and outer cover layer materials. In another preferred method, each of the cover materials is formed into a pair of half cups, and the resulting pairs of half cups are successively placed over the solid core and compression molded.

In the golf balls of the invention, it is critical that the outer cover layer have a lower Shore D hardness than the inner cover layer.

The inner cover layer has a Shore D hardness of at least 50, preferably at least 51, more preferably at least 52, and most preferably at least 53, but not more than 80, preferably not more than 75, more preferably not more than 70, and most preferably not more than 65.

The outer cover layer has a Shore D hardness of at least 35, preferably at least 40, more preferably at least 45, and most preferably at least 48, but not more than 60, preferably not more than 58, more preferably not more than 56, and most preferably not more than 54.

In the practice of the invention, it is critical for the outer cover layer to have a Shore D hardness that is lower than the Shore D hardness of the inner cover layer. It is advantageous for the inner and outer cover layers to have a difference in Shore D hardness of preferably at least 2, more preferably at least 5, even more preferably at least 7, and most preferably at least 9, but preferably not more than 30, more preferably not more than 25, and even more preferably not more than 20.

It is recommended that the inner and outer cover layers have respective thicknesses of preferably at least 0.7 mm, and more preferably at least 1.0 mm, but preferably not more than 3.0 mm, more preferably not more than 2.5 mm, even more preferably not more than 2.0 mm, and most preferably not more than 1.8 mm.

The golf ball of the invention may be manufactured for competitive use by imparting the ball with a diameter and weight which conform with the Rules of Golf; that is, a diameter of at least 42.67 mm and a weight of not more than 45.93 g. It is recommended that the diameter be preferably not more than 44.0 mm, more preferably not more than 43.5 mm, and most preferably not more than 43.0 mm; and that the weight be preferably at least 44.5 g, more preferably at least 45.0 g, even more preferably at least 45.1 g, and most preferably at least 45.2 g.

In the golf ball of the invention, because a material obtained by molding under heat a rubber composition and having an excellent resilience is used in the core, the ball has an excellent rebound overall. Moreover, the golf ball of the invention has a good, soft feel on impact and an excellent spin performance that enables the ball to travel farther when played.

EXAMPLES

The following Examples and Comparative Examples are provided by way of illustration and not by way of limitation.

Examples 1 and 2, Comparative Examples 1 to 4

Cores (spherical moldings) having a diameter of 36.4 mm and a weight of 29 g were produced by working together, with a kneader, the respective starting materials in the proportions shown in Table 1 so as to prepare a rubber composition, then carrying out 20 minutes of vulcanization at 160° C. in a spherical mold.

TABLE 1

| | | Core No. | | | |
|---|---|---|---|---|---|
| | | No. 1 | No. 2 | No. 3 | No. 4 |
| Formulation (pbw) | Polybutadiene EC140 | 100 | | | |
| | Polybutadiene BR51 | | 100 | | |
| | Polybutadiene BR60 | | | 100 | |
| | Polybutadiene BR11 | | | | 100 |
| | Organic peroxide | 1.4 | 1.4 | 1.4 | 1.4 |
| | Zinc oxide | 18 | 18 | 18 | 18 |
| | Antioxidant | 0.1 | 0.1 | 0.1 | 0.1 |
| | Zinc diacrylate | 27 | 27 | 27 | 27 |
| | Zinc salt of pentachlorothiophenol | 1 | 1 | 1 | 1 |

Details of the above formulation are provided below.

Polybutadiene rubber: EC140 (trade name), available from Firestone Polymers. Polymerized with a neodymium catalyst. Mooney viscosity, 43; $T_{80}$ value, 2.3.

Polybutadiene rubber: BR51 (trade name), available from JSR Corporation. Polymerized with a neodymium catalyst. Mooney viscosity, 39; $T_{80}$ value, 5.0.

Polybutadiene rubber: BR60 (trade name), available from Polimeri Srl. Polymerized with a neodymium catalyst. Mooney viscosity, 57; $T_{80}$ value, 4.6.

Polybutadiene rubber: BR11 (trade name), available from JSR Corporation. Polymerized with a nickel catalyst. Mooney viscosity, 44 $T_{80}$ value, 4.9.

Organic peroxide: Dicumyl peroxide, available from NOF Corporation under the trade name Percumyl D.

Zinc oxide: Available from Sakai Chemical Industry Co., Ltd. under the trade name Sanshu Sanka Aen. Average particle size, 0.6 μm (air permeametry).

Antioxidant: Available from Ouchi Shinko Chemical Industry Co., Ltd. under the trade name Nocrac NS-30.

Zinc diacrylate: Available from Nippon Shokubai Co., Ltd. under the trade name ZN-DA85S.

The deflection of the core when compressed under a final load of 1,275 N (130 kgf) from an initial load state of 98 N (10 kgf) was determined. The results are given in Table 3.

The resulting core was placed in a given mold, and the resin shown in Table 2 was injection-molded, thereby forming an inner cover layer-encased core having a diameter of about 39.7 mm. The inner cover layer-encased core was then transferred to another mold and the resin shown in Table 2 was injection-molded so as to produce a three-piece solid golf ball having a diameter of about 42.7 mm and a weight of about 45.3 g. Trade names of some of the ingredients used are indicated below.

Himilan: Ionomer resins produced by DuPont-Mitsui Polychemicals Co., Ltd.

Surlyn: Ionomer resins produced by E.I. DuPont & Nemours & Co.

Dynaron: A butadiene-styrene block copolymer hydrogenation product produced by JSR Corporation.

Pandex: Thermoplastic polyurethane elastomers produced by DIC-Bayer.

TABLE 2

| | | A | B | C | D | E | F |
|---|---|---|---|---|---|---|---|
| Formulation (pbw) | Himilan 1706 | 50 | | | | | |
| | Himilan 1605 | 50 | | | | | |
| | Himilan 1557 | | | | | | 20 |
| | Himilan 1855 | | | | | | 30 |
| | Surlyn 8945 | | 35 | | | | |
| | Surlyn 9945 | | 35 | | | | |
| | Surlyn 8120 | | | 100 | | | 50 |
| | Dynaron 6100P | | 30 | | | | |
| | Pandex T8290 | | | | 50 | | |
| | Pandex T8295 | | | | 50 | 100 | |
| | Titanium dioxide | 4 | 4 | 4 | 2.7 | 2.7 | 4 |

The performances of the golf balls obtained were examined as follows. The results are shown in Table 3.

Material Properties

The Shore D hardnesses of the inner cover layer and the outer cover layer are shown as the surface hardnesses of the respective materials, as measured with a durometer by the test method described in ASTM D2240.

Golf Ball Properties

The carry and total distance were measured when the ball was hit at a head speed of 50 m/s with a driver (W#1) mounted on a swing machine.

Feel

The feel of the ball when actually shot with a driver (number one wood) and a putter was rated by a 10-member panel composed of five professional golfers and five top-caliber amateur golfers as "Too hard," "Good" or "Too soft." The rating assigned most often to a particular ball was used as that ball's overall rating.

Spin on Approach Shots

The spin rate of the golf ball when hit at a head speed of 20 m/s using a sand wedge (SW) mounted on a swing robot was measured.

TABLE 3

|  |  | Example | | Comparative Example | | | |
|---|---|---|---|---|---|---|---|
|  |  | 1 | 2 | 1 | 2 | 3 | 4 |
| Core | Type | 1 | 1 | 1 | 2 | 3 | 4 |
|  | Diameter (mm) | 36.4 | 36.4 | 36.4 | 36.4 | 36.4 | 36.4 |
|  | Weight (g) | 29 | 29 | 29 | 29 | 29 | 29 |
|  | Deflection (mm) | 3.7 | 3.7 | 3.7 | 3.7 | 3.7 | 3.6 |
| Inner cover layer | Type | A | B | C | B | B | B |
|  | Shore D hardness | 63 | 56 | 45 | 56 | 56 | 56 |
|  | Specific gravity | 0.98 | 0.97 | 0.98 | 0.97 | 0.97 | 0.97 |
|  | Gauge (mm) | 1.65 | 1.65 | 1.65 | 1.65 | 1.65 | 1.65 |
| Outer cover layer | Type | D | E | F | E | E | E |
|  | Shore D hardness | 47 | 51 | 53 | 51 | 51 | 51 |
|  | Specific gravity | 1.18 | 1.18 | 0.98 | 1.18 | 1.18 | 1.18 |
|  | Gauge (mm) | 1.49 | 1.50 | 1.50 | 1.50 | 1.50 | 1.50 |
| Ball properties | #W1 HS 50 Carry (m) | 238.4 | 238 | 228.6 | 226.1 | 225.3 | 223.3 |
|  | Total distance (m) | 268.8 | 268.6 | 258.2 | 252.5 | 251.8 | 249.8 |
|  | Spin rate (rpm) | 3301 | 3338 | 3404 | 3325 | 3340 | 3329 |
|  | Feel | good | good | too soft | good | good | good |
| Spin rate on approach shot (rpm) (Sand wedge, HS 20) | | 6703 | 6600 | 6557 | 6270 | 6229 | 6198 |
| Feel on shots with a putter | | good | good | too soft | good | good | good |

As is apparent from the results shown in Table 3, compared with the golf balls according to the examples of the invention, the golf balls of Comparative Examples 1 to 4 failed to travel a satisfactory distance and had a poor feel on impact.

The invention claimed is:

1. A golf ball comprising a core, an inner cover layer and an outer cover layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; the inner cover layer has a Shore D hardness of from 50 to 80; and the outer cover layer has a Shore D hardness of from 35 to 60 which is lower than the Shore D hardness of the inner cover layer.

2. The golf ball of claim 1, wherein the rubber composition further comprises (d) an organosulfur compound.

3. The golf ball of claim 1, wherein the polybutadiene having a stress relaxation time ($T_{80}$) of 3.5 or less accounts for at least 40 wt % of the base rubber.

4. The golf ball of claim 1, wherein the polybutadiene having a stress relaxation time ($T_{80}$) of 3.5 or less is a polybutadiene prepared using a rare-earth catalyst.

5. The golf ball of claim 1, wherein the polybutadiene having a stress relaxation time ($T_{80}$) of 3.5 or less is a polybutadiene prepared by polymerization using a rare-earth catalyst, followed by terminal modification.

6. The golf ball of claim 1, wherein the difference of a Shore D hardness between the inner cover layer and the outer cover layer is at least 7.

* * * * *